United States Patent Office 2,841,581
Patented July 1, 1958

2,841,581

MANUFACTURE OF NEW QUINONE COMPOUNDS

Adrian Marxer, Basel, Switzerland, assignor to Ciba Pharmaceutical Products, Inc., Summit, N. J., a corporation of New Jersey No Drawing. Application April 25, 1956
Serial No. 580,456

Claims priority, application Switzerland May 13, 1955

16 Claims. (Cl. 260—239)

This invention relates to the manufacture of new quinone compounds, namely 2:6-bis-ethyleneimino-p-benzoquinones, the ethylene residues of which are unsubstituted or each contain one lower alkyl residue, preferably a methyl residue, and which contain in the 3- and 5-positions halogen atoms, such as chlorine, bromine or iodine atoms, lower alkoxy or lower alkyl mercapto groups in which the alkyl residue is, for example, methyl, ethyl, propyl or butyl. The compounds intended to be included within the scope of this invention are primarily the quinones of the formulae:

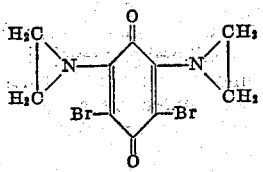

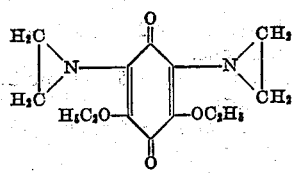

and

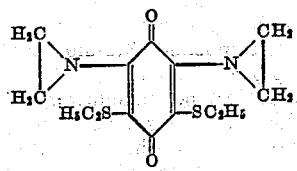

The new compounds exhibit bactericidal properties and are active against amoebae, for example *Entamoeba histolytica*.

It is known that by reaction of quinones with amines amino-quinones are obtained. However, it has not hitherto been possible to produce 2:6-bis-ethyleneimino-p-benzoquinones by this method. When, for example, 2:6-dichloro-p-benzoquinone is reacted with ethyleneimine, 3:6 - bis - ethyleneimino - 2 - chloro-p-benzoquinone is obtained [see Petersen, Gauss and Urbschat, "Angewandte Chemie" 67, 227 (1955)].

The new 2:6-bis-ethyleneimino-p-benzoquinones are obtained when 3:5-dihalogeno-p-benzoquinones, which contain in the 2- and 6-positions etherified hydroxyl or mercapto groups, are reacted with unsubstituted ethyleneimine or with ethyleneimine which contains, attached to a carbon atom, one lower alkyl residue, preferably a methyl residue. If desired the halogen atoms in the resulting 2:6-bis-ethyleneimino-3:5-dihalogeno-p-benzoquinones are replaced by lower alkoxy or lower alkyl mercapto groups.

The reaction is preferably carried out in a solvent, such as dioxane or ethyl, isopropyl or butyl alcohol, isopropyl ether or the like, and if desired in the presence of condensing agents such as tertiary bases. The replacement of the halogen atoms by lower alkoxy or lower alkyl mercapto groups can be carried out in the customary manner, for example by reaction with corresponding alkali alcoholates, such as sodium alcoholates, or alkali mercaptides, preferably at room temperature.

The quinones of the present invention can be used as bactericides and also as medicaments especially in treating diseases caused by amoebae, for example in the form of pharmaceutical preparations. These contain the specified compounds in admixture with a pharmaceutical organic or inorganic carrier material suitable for enteral, parenteral or local administration. As carriers there are concerned such substances as do not react with the new compounds, as for example gelatine, lactose, starch, magnesium stearate, talc, vegetable oils, benzyl alcohols, gums, polyalkylene glycols, petroleum jelly, cholesterol or other known medicament carriers. The pharmaceutical preparations can be made up in the form, for example of tablets, dragees, powders, salves, creams, suppositories or in liquid form as solutions, suspensions or emulsions. If desired, they are sterilized and/or contain auxiliary substances, such as preserving, stabilizing, wetting or emulsifying agents. They can also contain other therapeutically valuable substances.

The following examples illustrate the invention:

*Example 1*

48.9 grams of 3:5-dibromo-2:6-dimethoxy-p-benzoquinone are dissolved in 600 cc. of dioxane. To the solution is added dropwise at room temperature a mixture of 33.5 grams of triethylamine and 13.6 grams of ethyleneimine in 100 cc. of dioxane. The whole is then stirred for 12 hours at room temperature. The separated violet needles of 3:5-dibromo-2:6-bis-ethyleneimino-p-benzoquinone of the formula:

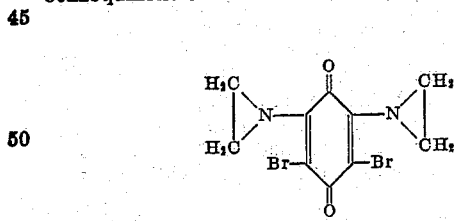

are filtered with suction. From the mother liquor, on concentration, a further quantity of the compound is obtained, which after recrystallization from chloroform-methanol melts at 175° C. with decomposition.

*Example 2*

34.8 grams of 3:5-dibromo-2:6-ethyleneimino-p-benzoquinone are introduced into a solution of 5 grams of sodium in 250 cc. of absolute alcohol, an internal temperature of about 25° C. being maintained. The solution is stirred at this temperature for a further 12 hours and then evaporated under reduced pressure to ⅓ of the original volume. The residue is filtered with suction, washed for the removal of sodium bromide thoroughly with water and finally with a little alcohol. Black-violet, square or rectangular plates or cubes are obtained of 3:5-diethoxy-2:6-bis-ethyleneimino-p-benzoquinone of melting point 119° C. It possesses the formula:

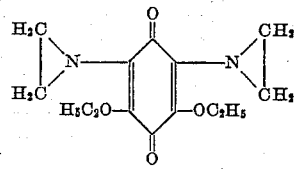

If in the above reaction the quantity of sodium is increased to 7:5 grams, the yield can be further raised.

*Example 3*

A solution of 2.3 grams of sodium in 100 cc. of absolute alcohol is cooled and mixed with 6.5 grams of ethyl mercaptan. While this solution is being cooled slightly, 17.4 grams of 3:5-dibromo-2:6-bis-ethyleneimino-p-benzoquinone are introduced in such mnner that the temperature does not exceed 26° C. The whole is stirred at room temperature for 12 hours and then mixed with 400 cc. of water. After some stirring, the yellow-brown suspension is filtered with suction. The residue is boiled with 200 cc. of alcohol, some violet starting material is separated, and the mother liquor concentrated by evaporation, whereupon the yellow-green crystals of 3:5 - bis - ethylmercapto - 2:6 - bis - ethyleneimino-p-benzoquinone of the formula:

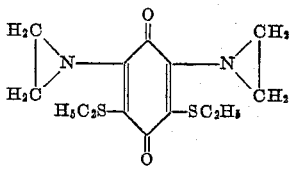

are obtained. The substance melts at 86–89° C.

*Example 4*

65.2 grams of 3:5-dibromo-2:6-dimethoxy-p-benzoquinone are dissolved in 600 cc. of dioxane, and to this solution there is added dropwise a mixture of 44.5 grams of triethylamine and 24.0 grams of C-methyl-ethyleneimine in 100 cc. of dioxane. The temperature is maintained at 50° C. whilst the mixture is added and for a further 5 hours. The clear solution is evaporated to dryness under reduced pressure, the crystalline residue is allowed to stand with methanol, filtered with suction to remove the methanol and recrystallized from hot methanol. The resulting 3:5-dibromo-2:6-bis-methylethyleneimino-p-benzoquinone melts at 128° C. and decomposes with explosion at 195° C. It has the formula:

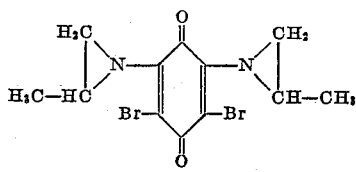

*Example 5*

18.8 grams of the 3:5-dibromo-2:6-bis-methylethyleneimino-p-benzoquinone obtainable according to Example 4 are added to a solution of 2.3 grams of sodium in 180 cc. of absolute methanol. The internal temperature increases from 24° to 29° C. After stirring for eight hours at room temperature, the mixture is filtered, the mother liquor evaporated to dryness under reduced pressure and the residue heated to the boil with 200 cc. of benzene. Insoluble sodium bromide which is formed is filtered off, the benzene solution is concentrated to a small volume and petroleum ether is added gradually, violet crystals of 3:5-dimethoxy-2:6-bis-methylethyleneimino-p-benzoquinone of melting point 80° C. being obtained. The compound has the formula:

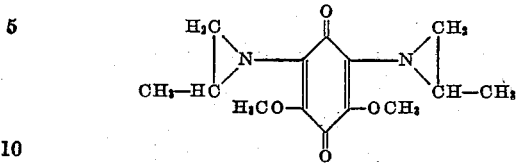

*Example 6*

18.8 grams of 3:5-dibromo-2:6-bis-methylethyleneimino-p-benzoquinone obtainable according to Example 4 are added to a solution of 2.3 grams of sodium in 180 cc. of absolute ethyl alcohol and worked up as described in Example 5. Violet crystals of the formula:

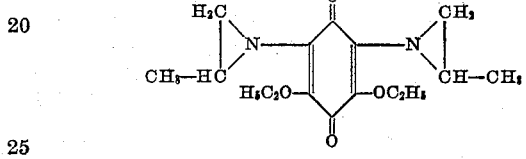

are obtained. On being heated rapidly, the resulting 3:5-diethoxy-2:6-bis-methylethyleneimino-p-benzoquinone decomposes at 93° C.

What is claimed is:

1. 2:6-bis-ethyleneimino-p-benzoquinones wherein the 2- and 6-positions each contain a member of the group consisting of unsubstituted ethyleneimino and mono-lower alkyl-ethyleneimino radicals and wherein the 3- and 5-positions are substituted by a member of the group consisting of halo, lower alkoxy and lower alkyl mercapto radicals.

2. A 3:5-dihalo-2:6-bis-(lower alkyl-ethyleneimino)-p-benzoquinone.

3. A 3:5-di-lower alkoxy-2:6-bis-(lower alkyl-ethyleneimino)-p-benzoquinone.

4. The new compound 3:5-dibromo-2:6-bis-ethyleneimino-p-benzoquinone.

5. The new compound 3:5-diethoxy-2:6-bis-ethyleneimino-p-benzoquinone.

6. The new compound 3:5-bis-ethylmercapto-2:6-bis-ethyleneimino-p-benzoquinone.

7. The new compound 3:5-dimethoxy-2:6-bis-methylethyleneimino-p-benzoquinone.

8. The new compound 3:5-diethoxy-2:6-bis-methylethyleneimino-p-benzoquinone.

9. The new compound 3:5-dibromo-2:6-bis-methylethyleneimino-p-benzoquinone.

10. A process for the manufacture of new quinone compounds which comprises the step of treating a 3:5-dihalogeno-p-benzoquinone wherein each of the 2- and 6-positions contains a member of the group consisting of etherified hydroxyl and mercapto substituents, with a member of the group consisting of unsubstituted ethyleneimine and ethyleneimine containing a mono-lower alkyl residue attached to a carbon atom and treating the resulting compound with an alkali lower alcoholate.

11. A process as set forth in claim 10 wherein the reaction is carried out with ethyleneimine.

12. A process as set forth in claim 10, wherein the reaction is carried out with C-methyl-ethyleneimine.

13. A process for the manufacture of new quinone compounds which comprises the step of treating a 3:5-dihalogeno-p-benzoquinone wherein each of the 2- and 6-positions contains a member of the group consisting of etherified hydroxyl and mercapto substituents, with a member of the group consisting of unsubstituted ethyleneimine and ethyleneimine containing a mono-lower alkyl residue attached to a carbon atom.

14. A process which comprises the step of treating 3:5-dibromo-2:6-dimethoxy-p-benzoquinone with ethyleneimine in the presence of an organic solvent and a tertiary base.

15. A process which comprises the step of treating 3:5-dibromo-2:6-bis-ethyleneimino-p-benzoquinone with an alkali lower alcoholate.

16. A process which comprises the step of treating 3:5-dibromo-2:6-bis-ethyleneimino-p-benzoquinone with an alkali lower mercaptide in the presence of an organic solvent.

References Cited in the file of this patent
UNITED STATES PATENTS 2,770,617    Marxer _____ Nov. 13, 1956

OTHER REFERENCES

Peterson et al.: Andewandte Chemie 67, 217–231 (1955).